United States Patent [19]

Kitahara et al.

[11] Patent Number: 5,266,654
[45] Date of Patent: Nov. 30, 1993

[54] RESIN COMPOSITION

[75] Inventors: Mikio Kitahara, Yokohama; Koichi Machida, Kanagawa; Takayuki Kubo, Kanagawa; Motoyuki Torikai, Kanagawa; Koutarou Asahina, Kanagawa; Junsuke Tanaka, Kanagawa; Akihiro Yamaguchi, Kanagawa, all of Japan

[73] Assignee: Mitsui Toatsu Chemicals, Incorporated, Tokyo, Japan

[21] Appl. No.: 736,439

[22] Filed: Jul. 26, 1991

[30] Foreign Application Priority Data

Aug. 13, 1990 [JP] Japan ............... 2-211545
Aug. 17, 1990 [JP] Japan ............... 2-215837

[51] Int. Cl.$^5$ ............... C08L 79/08; C08L 61/32; C08L 63/00; C08G 73/10
[52] U.S. Cl. ............... 525/422; 525/486; 525/423; 525/534; 525/526
[58] Field of Search ............... 525/422, 486, 423, 534, 525/526

[56] References Cited

U.S. PATENT DOCUMENTS 3,923,721 12/1975 Edwards et al. ............... 260/38
5,041,507 8/1991 Kanagawa ............... 525/486

FOREIGN PATENT DOCUMENTS 400898 12/1990 European Pat. Off. .
47-15111 5/1972 Japan .
48-10960 4/1973 Japan .
286649 6/1988 Japan .
2045554 8/1988 Japan .
1-213335 8/1989 Japan .
2-43205 2/1990 Japan .
2-45554 2/1990 Japan .

OTHER PUBLICATIONS

World Patents Index Latest, Week 8940, AN 89-289807, JPA 1-213335, Aug. 28 1989.
Chemical Patents Index, Basic Abstracts Journal, Week 9033, AN 90-251082/33 JPA 2-175709, Jul. 9, 1990.
Chemical Patents Index, Basic Abstracts Journal, Week 9013, AN 90-094623/13 JPA 2-045554, Feb. 15, 1990.
Patent Abstracts of Japan, vol. 13, No. 236, May 30, 1989; JPA 1-045426, Feb. 17, 1989.

Primary Examiner—James J. Seidleck
Assistant Examiner—I. Zemel
Attorney, Agent, or Firm—Burns, Doane, Swecker & Mathis

[57] ABSTRACT

A resin composition for sealing semiconductors which comprises an organic component (A) which contains (a) a polymaleimide compound represented by the formula (I):

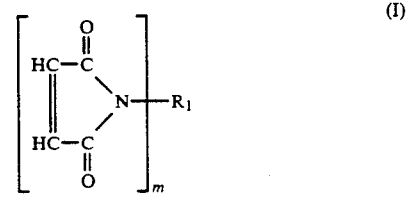

wherein $R_1$ is a m-valent organic group having two or more carbon atoms and m is an integer of two or more and (b) a phenolic aralkyl resin represented by the formula (II):

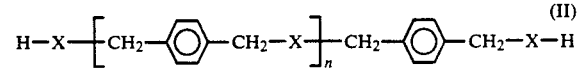

wherein X is a divalent group having the formula (Abstract continued on next page.)

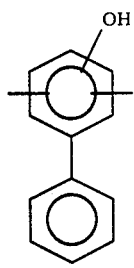
or
-continued
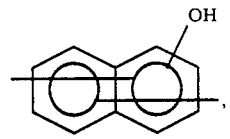
and n is an integer of from 0 to 100, or contains a mixture of the phenolic aralkyl resin and a phenol, and component (B) which contains an inorganic filler.
6 Claims, No Drawings

RESIN COMPOSITION

Background of the Invention

1. Field of the Invention

The present invention relates to a resin composition having excellent heat resistance and crack resistance. More particularly, the invention relates to a resin composition for improving resistance to heat and cracking as an insulating material, laminate sheet material and resin sealing material in the field of electric and electronic parts and semiconductors. Most particularly, the invention relates to a resin composition which is suitable for sealing a semiconductor device having solder crack resistance.

2. Description of the Prior Art

Resin compositions having excellent heat resistance and crack resistance have recently been required in the field of electric and electronic parts and semiconductors. For example, in the field of electric and electronic parts, semiconductors in particular, mounting density on a substrate fitted with the parts tends to increase accompanied by miniaturization and thickness reduction of apparatus and equipment where these parts are to be fitted. The parts themselves have a tendency to diversify their function. As to the materials for sealing these parts, it has been strongly desired to develop resin compositions which have excellent heat resistance to high temperature solder in the soldering step to the substrate.

Conventionally, in the resin compositions employed for such use, that is, so-called semiconductor sealing resin compositions, a resin composition mainly comprising epoxy resin represented by o-cresol novolak type epoxy resin, phenolic novolak resin as a hardener and silica is excellent in moldability and reliability and hence is primarily used in the field. However, the resin-sealing type semiconductor devices are changing to surface mounting type semiconductor devices as a result of the trend to the above mentioned high density mounting. The surface mounting type semiconductor devices differ from conventional inserting type semiconductor devices. The whole portion of the semiconductor devices is exposed to a soldering temperature of 200° C. or more in the soldering step to the substrate.

In the step, cracks have occurred in the sealing resin and have caused a problem of seriously decreasing reliability of the semiconductor devices. The cracks in the soldering step are developed by absorbing moisture during storage of the semiconductor devices, explosively expanding the moisture at a temperature of 200° C. or more, and causing stress which exceeds the strength of the resin. In such a case, the stress on the resin is approximately indicated by the following equation.

$$\sigma = k \cdot p \cdot a^2 / t^2$$

wherein $\sigma$ is the stress on the resin, k is a constant, p is moisture vapor pressure, a is the length of a short side of a die pad, and t is the thickness of the resin in the bottom part of the die pad.

Accordingly, imide based resin has been examined in order to provide resin strength sufficient to overcome the stress due to moisture expansion by increasing the glass transition temperature of the sealing resin. However, cured products of the imide resin are liable to increase moisture absorption and hence, in view of the above equation, the stress on the resin increases and inhibits utilization of high strength which is a characteristic of imide-based resin. Therefore, it is an effective measure for inhibiting crack development to decrease moisture absorption and to lower moisture vapor pressure in the soldering step.

SUMMARY OF THE INVENTION

One object of the present invention is to provide a resin composition which has excellent heat resistance and crack resistance and can also be applied to a resin sealing type semiconductor device required to have solder crack resistance in a mounting step.

Another object of the present invention is to provide a resin composition which can improve heat resistance and crack resistance of insulating materials and laminate sheet materials and can be widely applied to electric and electronic parts.

As a result of an intensive investigation in order to accomplish the above objects, the present inventors have succeeded in remarkably enhancing the strength of a sealing resin without increasing the moisture absorption of the resin by using polymaleimide which is capable of curing at relatively lower temperatures in polyimide resin and further by simultaneously using a phenolic aralkyl resin having low moisture absorption. Thus the present invention has been completed.

Accordingly, one aspect of the present invention is a resin composition comprising an organic component containing polymaleimide represented by the formula (I) and a phenolic aralkyl resin represented by the formula (II) or further containing an epoxy resin, and an inorganic filler.

A more particular aspect of the present invention is a resin composition comprising an organic component (A) containing (a) a polymaleimide compound represented by the formula (I):

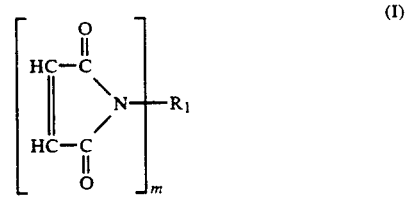

wherein $R_1$ is a m-valent organic group having two or more carbon atoms and m is an integer of two or more and (b) a phenolic aralkyl resin represented by the formula (II):

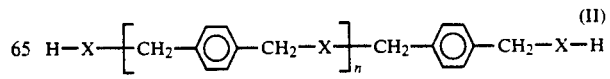

wherein X is a divalent group having the formula

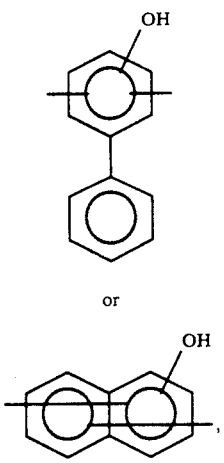

and n is an integer of from 0 to 100, or containing a mixture of the phenolic aralkyl resin and a phenol, and component (B) containing an inorganic filler; or a resin composition comprising an organic component (A) containing the above polymaleimide compound (a) and the phenolic aralkyl resin (b), or a mixture of the phenolic aralkyl resin and a phenol and further containing an epoxy resin (C), and a component (B) containing an inorganic filler.

The resin composition is particularly excellent in solder crack resistance and is suitable for use in semiconductor sealing.

DETAILED DESCRIPTION OF THE INVENTION

The ingredient (a) used in the organic component (A) of the composition in the present invention is a polymaleimide compound represented by the formula (I). The polymaleimide compound of the formula (I) has two or more maleimide groups in a molecule.

Exemplary polymaleimide compounds which can be used include
N,N'-ethylenebismaleimide,
N,N'-hexamethylenebismaleimide,
N,N'-(1,3-phenylene)bismaleimide,
N,N'-(1,4-phenylene)bismaleimide,
bis(4-maleimidophenyl)methane,
bis(4-maleimidophenyl)ether,
bis(3-chloro-4-maleimidophenyl)methane,
bis(4-maleimidophenyl)sulfone,
bis(4-maleimidocyclohexyl)methane,
1,4-bis(4-maleimidophenyl)cyclohexane,
1,4-bis(maleimidomethyl)cyclohexane,
1,4-bis(maleimidomethyl)benzene,
1,3-bis(4-maleimidophenoxy)benzene,
1,3-bis(3-maleimidophenoxy)benzene,
bis [4-(3-maleimidophenoxy)phenyl] methane,
bis [4-(4-maleimidophenoxy)phenyl] methane,
1,1-bis [4-(3-maleimidophenoxy)phenyl] ethane,
1,1-bis [4-(4-maleimidophenoxy)phenyl] ethane,
1,2-bis [4 (3 maleimidophenoxy)phenyl] ethane,
1,2-bis [4-(4-maleimidophenoxy)phenyl] ethane,
2,2-bis [4-(3-maleimidophenoxy)phenyl] propane,
2,2-bis [4-(4-maleimidophenoxy)phenyl] propane,
2,2-bis [4-(3 maleimidophenoxy)phenyl] butane,
2,2-bis [4-(4 maleimidophenoxy)phenyl] butane,
2,2-bis [4-(3-maleimidophenoxy)phenyl]-1,1,1,3,3,3-hexafluoropropane,
2,2-bis [4-(4-maleimidophenoxy)phenyl]-1,1,1,3,3,3-hexafluoropropane,
4,4'-bis(3-maleimidophenoxy)biphenyl,
4,4'-bis(4 maleimidophenoxy)biphenyl,
bis [4-(3-maleimidophenoxy)phenyl] ketone,
bis [4-(4-maleimidophenoxy)phenyl] ketone,
bis [4-(3-maleimidophenoxy)phenyl] sulfide,
bis [4-maleimidophenoxy)phenyl] sulfide,
bis [4-(3-maleimidophenoxy)phenyl] sulfoxide,
bis [4-(4-maleimidophenoxy)phenyl] sulfoxide,
bis [4-(3-maleimidophenoxy)phenyl] sulfone,
bis [4-(4-maleimidophenoxy)phenyl] sulfone,
bis [4-(3-maleimidophenoxy)phenyl] ether,
bis [4-(4-maleimidophenoxy)phenyl] ether,
polymaleimidophenylmethylene and a polymaleimide compound represented by the formula (V):

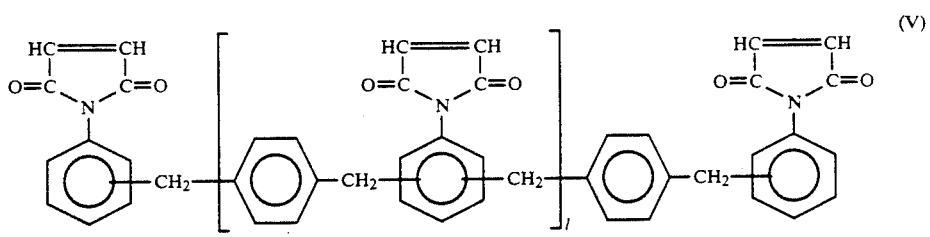

wherein l is from 0 to 10 in average.

These polyimide compounds can be used singly or as a mixture.

The ingredient (b) which is used in the component (A) of the composition in the invention is a phenolic aralkyl resin represented by the formula (II) or a mixture of the phenolic aralkyl resin with a phenol. The phenolic aralkyl resin of the formula (II) may be used singly or in combination with a compound having two or more phenolic hydroxyl groups in a molecule.

The phenolic aralkyl resin represented by the formula (II) in the invention is a phenylphenol aralkyl resin represented by the formula (II-A):

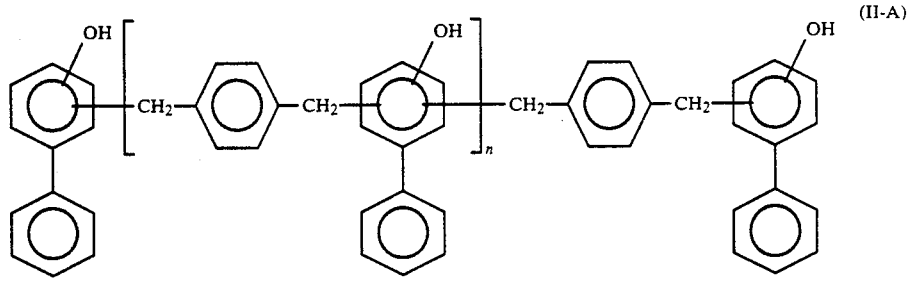

wherein n is an integer of from 0 to 100, or a naphthol aralkyl resin represented by the formula (II-B):

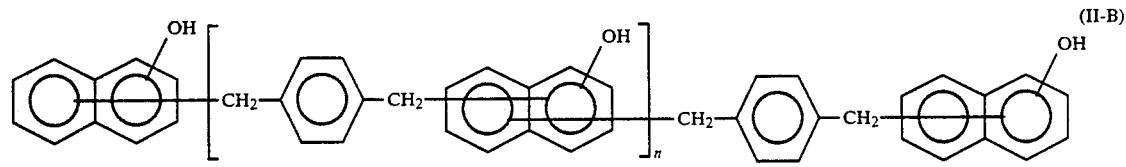

wherein n is an integer of from 0 to 100. The phenolic aralkyl resin in which n is an iterger of from 0 to 5 is a preferred resin in view of having a low softening point and excellent fluidity.

These phenolic aralkyl resins can be prepared by reacting an aralkyl alcohol derivative represented by the formula (VI):

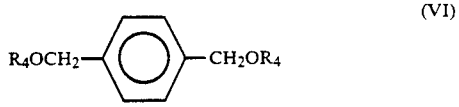

wherein $R_4$ is a hydrogen atom or an alkyl group having 4 or less carbon atoms, with phenylphenol or naphthol having the formula (VII):

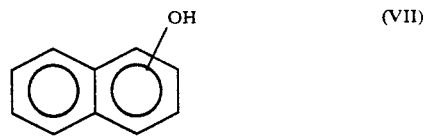

in the presence of an acid catalyst.

Representative aralkyl alcohol derivatives which can be used include, for example,
α,α'-dihydroxy-p-xylene,
α,α'-dimethoxy-p xylene,
α,α'-diethoxy-p-xylene,
α,α'-di-n-propoxy-p-xylene,
α,α'-diisopropoxy-p-xylene,
α,α'-n-butoxy-p-xylene,
α,α'-di-sec-butoxy-p-xylene and
α,α'-diisobutoxy-p xylene.

The phenylphenols which can be used are o-phenylphenol, m-phenylphenol and p-phenylphenol.

Naphthols of the formula (VII) which can be used in the invention are α-naphthol and β-naphthol.

The reaction of the aralkyl alcohol derivative with naphthol or phenylphenol is carried out by using naphthol or phenylphenol in a range of usually from 1.3 to 20 moles, preferably from 1.5 to 10 moles per mole of the aralkyl alcohol derivative in the presence of an acid catalyst in a temperature range of 110° C. or more, preferably from 130° to 180° C. Useful acid catalysts are inorganic or organic acids, for example, a single compound or a mixture of compounds selected from mineral acids such as hydrochloric acid, sulfuric acid and phosphoric acid; Friedel-Crafts type catalysts such as zinc chloride, aluminum chloride, stannic chloride and ferric chloride; organic sulfonic acids such as methanesulfonic acid and p-toluenesulfonic acid; sulfate esters such as dimethyl sulfate and diethyl sulfate; and ultra strong acids such as trifluoromethanesulfonic acid and boron trifluoride. The amount of the catalyst is usually from 0.0001 to 10% by weight, preferably from 0.001 to 1% by weight for the total weight of naphthol or phenylphenol and the aralkyl alcohol derivative.

As the progress of the reaction, formed hydrogen halide, water or alcohol is distilled out of the reaction system. After finishing the reaction, unreacted naphthol or phenylphenol is removed by vacuum distillation or other suitable methods.

In the composition of the present invention, the phenol compound which has two or more phenolic hydroxyl groups in a molecule and can be used in combination with the phenolic aralkyl resin represented by the formula (II) is most preferably a phenolic novolak resin which is a reaction product of phenol and/or substituted phenol with an aldehyde and is represented by the formula (III):

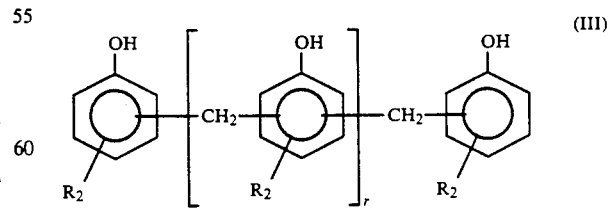

wherein $R_2$ is a hydrogen atom, hydroxyl group or alkyl group having from 1 to 9 carbon atoms, and r is an integer of 1 or more. Other phenol compounds include, for example, aralkyl resins having the formula (VIII) and formula (IX):

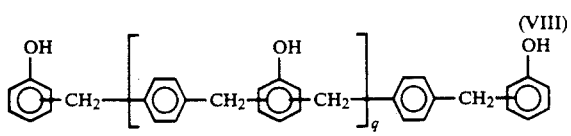

wherein q is an integer of from 0 to 100, and

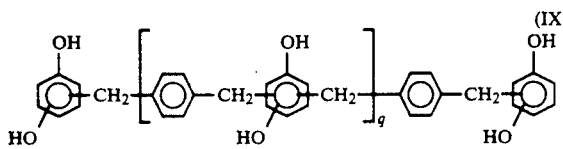

wherein q is an integer of from 0 to 100, and polyhydric phenols such as trihydroxyphenylmethane, tetrahydroxyphenylethane and alkanetetrakisphenol. The aralkyl resin which n is an integer of from 0 to 5 is a preferred resin in view of having low softening point and excellent fluidity.

When the phenolic aralkyl resin is used in combination with the above phenol compound, the proportion is preferably in the range of from 0 to 100 parts by weight of the latter for 100 parts by weight of the former.

When the component (A) contains the ingredient (C), the epoxy resin which is most preferably used for the ingredient (C) is, in view of heat resistance and electrical properties, derived from phenolic novolak resin which is a reaction product of phenol and/or substituted phenol and aldehydes, and is represented by the formula (IV):

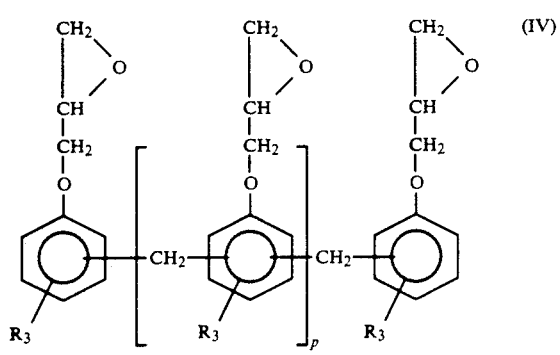

wherein $R_3$ is a hydrogen atom or alkyl group having from 1 to 9 carbon atoms and p is an interger of 1 or more. Other compounds having two or more epoxy groups in a molecule can also be used.

Exemplary epoxy resins include an epoxy resin derived from compounds having two or more active hydrogen in a molecule, for example, an epoxy resin obtained by reacting polyhydric phenols such as bisphenol A, bisphenol F, resorcinol, bishydroxydiphenyl ether, bishydroxybiphenyl, tetrabromobisphenol A, trihydroxyphenylmethane, tetrahydroxyphenylethane and alkanetetrakisphenol; polyhydric alcohols such as ethylene glycol, neopentyl glycol, glycerol, trimethylolpropane, pentaerythritol, diethylene glycol and polypropylene glycol; amines such as ethylenediamine, aniline and bis(4-aminophenyl)methane; and polycarboxylic acid such as adipic acid, phthalic acid and isophthalic acid, with epichlorohydrin or 2-methylepichlorohydrin, and other epoxy resins represented by the formula (II) and formula (XI):

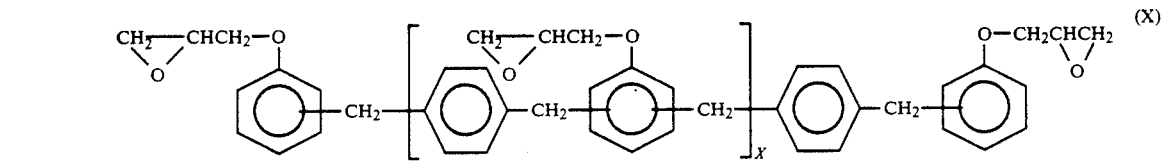

wherein x is an integer of from 0 to 100,

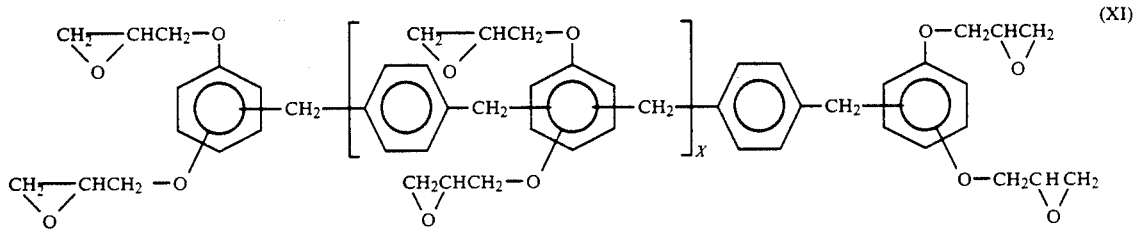

wherein x is an integer of from 0 to 100. The epoxy resin in which n is an integer of from 0 to 5 is a preferred resin in view of having low softening point and excellent fluidity. These epoxy resins are used singly or as a mixture.

The above epoxy resin can be modified with an oily or rubbery silicone compound. For example, Japanese Laid-Open Patent SHO 62-270617(1987) and 62-273222(1987) disclose silicone modified epoxy resin prepared by dispersing fine particles of silicone polymer into a reaction product of epoxy resin and vinyl polymer.

In the component (A) of the composition of the invention, the amount of the ingredient (a), i.e , the polymaleimide compound of the formula (I) and the ingredient (b), i.e., the phenolic aralkyl resin of the formula (II) or a mixture of the resin with phenols is usually in the range of from 10 to 500 parts by weight, preferably from 25 to 300 parts by weight of the ingredient (b) for 100 parts by weight of the ingredient (a).

When the component (A) contains the ingredient (c) in the composition of the invention, the amount of the ingredient (a), i.e., the polymaleimide compound of the formula (I), the ingredient (b), i.e., the phenolic aralkyl resin of the formula (II) or a mixture of the resin with phenols and the ingredient (c), i.e., the epoxy resin is in the range of usually from 10 to 500 parts by weight, preferably from 25 to 300 parts by weight of the sum of the ingredients (b) and (c), for 100 parts by weight of the ingredient (a), and in the ran9e of from 0.1 to 10 equivalents, preferably from 0.5 to 2.0 equivalents of the ingredient (c), i.e., the epoxy resin, per equivalent of the ingredient (b), i.e., the phenolic aralkyl resin of the formula (II) or a mixture of the resin with phenols.

In the practice of the invention, the resin composition can be formulated and kneaded by conventional methods. The polymaleimide compound can be previously dissolved in all or a portion of the ingredient (b) or a mixture of the ingredients (b) and (c). A prepolymer obtained by reacting these ingredients can also be used.

The inorganic fillers which can be used as the component (B) in the composition of the invention are in the form of powder or fiber. Representative inorganic fillers include, for example, crystalline silica, fused silica, alumina, silicon nitride, silicon carbide, talc, calcium silicate, calcium carbonate, mica, clay, titanium white and other inorganic powders; and glass fiber, carbon fiber and other inorganic fibers. Crystalline or fused silica powder is preferred in view of heat expansion coefficient and thermal conductivity. Spherical silica powder or a mixture of spherical silica powder and irregularly shaped silica powder is preferred in view of flowability in the molding.

The amount of the component (B), i.e., the inorganic filler is necessarily from 100 to 900 parts by weight, preferably from 200 to 600 parts by weight for 100 parts by weight of the sum of the ingredient (a), i.e., the polymaleimide compound of the formula (I), and the ingredient (b), i.e., the phenolic aralkyl resin or a mixture of the resin with phenols; or the sum of the ingredient (a), the ingredient (b) and the ingredient (c), i.e., the epoxy resin.

The above inorganic filler is preferably used in combination with a coupling agent in order to improve adhesion to the resin and enhance mechanical strength and heat resistance. The coupling agents which can be used are silane based, titanate based, aluminate based and zircon aluminate based coupling agents. Silane based coupling agents are preferred in these agents and a silane based coupling agent having reactive groups is most preferred.

Exemplary silane based coupling agents include, vinyltrimethoxysilane, vinyltriethoxysilane, N-(2-aminoethyl)-3-aminopropylmethyldimethoxysilane,
N-(2-aminoethyl)-3-aminopropyltrimethoxysilane,
3-aminopropyltriethoxysilane,
3-anilinopropyltrimethoxysilane,
3-glycidoxypropyltrimethoxysilane,
3-glycidoxypropylmethyldimethoxysilane,
2-(3,4-epoxycyclohexyl)ethyltrimethoxysilane,
3-methacryloxypropyltrimethoxysilane, and
3-mercaptopropyltrimethoxysilane.

These coupling agents are used singly or in combination. These silane based coupling agents are preferably fixed on the surface of the inorganic fillers in advance by adsorption or reaction.

The curing of the resin composition in the invention is preferably carried out in the presence of a curing accelerator.

Useful curing accelerators include, for example, 2-methylimidazole, 2-methyl-4-ethylimidazole, 2-heptadecylimidazole and other imidazoles; triethanolamine, triethylenediamine, N-methylmorpholine and other amines; tributylphosphine, triphenylphosphine, tritolylphosphine and other organic phosphines; tetraphenylphosphonium tetraphenylborate, triethylammonium tetraphenylborate and other tetraphenylborates; and 1,8-diazabicyclo (5, 4, 0) undecene and its derivatives.

These curing accelerators can be used singly or as a mixture and can also be used, if desired, in combination with organic peroxides or azo compounds.

The amount of the curing accelerator is in the range of from 0.01 to 10% by weight for the total amount of the ingredient (a), i.e., the polymaleimide compound of the formula (I) and the ingredient (b), i.e., the phenolic aralkyl resin of the formula (II) or the mixture of the resin with phenols, or for the total weight of the ingredient (a), the ingredient (b) and the ingredient (c), i.e., the epoxy resin. The resin composition of the invention can be, if desired, blended with reactive diluents such as diallyl phthalate, triallyl isocyanurate, and o,o'-diallylbisphenol A which are commonly used for imide resin; various silicone oils; release agents such as fatty acids, fatty acid salts and waxes; flame retardants such as bromine compounds, antimony and phosphorus; and colorants such as carbon black. The blend thus obtained is kneaded to prepare molding materials.

The present invention will hereinafter be illustrated in detail by way of examples. In the examples, properties of the composition were measured by the following methods.

Glass transition temperature:
  According to TMA method
Flexural strength and Flexural modulus:
  According to JIS K-6911
Moisture absorption:
  A specimen for Flexural test was used.
  The specimen was allowed to stand at 65° C. 95% RH for 168 hours in a thermohygrostat and thereafter weight increase of the specimen was measured.
VPS test:
  Semiconductor devices to be tested were allowed to stand at 65° C., 95% RH for 168 hours in a thermohygrostat and immediately thrown into a molten solder bath at 260° C. The number of the semiconductor devices having crack development was counted and indicated as follows.

$$\frac{\text{Number of cracked semiconductor devices}}{\text{Number of semiconductor devices tested}}$$

SYNTHESIS EXAMPLE 1 o-Phenylphenol aralkyl resin

To a reaction vessel equipped with a stirrer, thermometer, Dienstalk azeotropic trap and a reflux condenser, 332 g (2.0 moles) of α,α'-dimethoxy-p-xylene, 550 g (3.0 moles) of o-phenylphenol and 2.1 g (0.25%) of methanesulfonic acid were charged and reacted with stirring at 150°-1601° C. for 4 hours. Formed methanol was removed from the reaction system by the trap.

After finishing the reaction, unreacted o-phenylphenol and methanesulfonic acid were removed by distillation under reduced pressure to obtain 595 g of o-phenylphenol aralkyl resin.

The resin composition measured by high performance liquid chromatography was 20.1% of n=0, 16.9% of n=1, 13.3% of n=2, 10.8% of n-3, and 38.9% of n≧4. The resin had a hydroxyl equivalent of 283.8 g/eq and a softening point of 94° C.

SYNTHESIS EXAMPLE 2 p-Phenylphenol aralkyl resin

To the same reaction vessel as used in Synthesis Example 1, 207.3 g (1.5 moles) of α,α'-dihydroxy-p-xylene, 510 g (3.0 moles) of p-phenylphenol and 0.35 g (0.05%) of methanesulfonic acid were charged and reacted with stirring at 150°-160° C. for 4 hours. Formed methanol was removed from the reaction system by the trap.

After finishing the reaction, unreacted p-phenylphenol and methanesulfonic acid were removed by distillation under reduced pressure to obtain 395 g of p-phenylphenol aralkyl resin.

The resin composition measured by high performance liquid chromatography was 22.3% of n=0, 18.3% of n=1, 15.4% of n=2, 11.7% of n=3, and 32.3% of n≧4. The resin had a hydroxyl equivalent of 299.0 g/eq and a softening point of 105° C.

SYNTHESIS EXAMPLE 3

α-naphthol aralkyl resin

To the same reaction vessel as used in Synthesis Example 1, 249 g (1.5 moles) of α,α'-dimethoxy-p-xylene, 1080 g (7.5 moles) of α-naphthol and 4.65 g (0.05%) of methanesulfonic acid were charged and reacted with stirring at 150°-160° C. for 4 hours. Formed methanol was removed from the reaction system by the trap.

After finishing the reaction, unreacted α-naphthol and methanesulfonic acid were removed by distillation under reduced pressure to obtain 470 g of α-naphthol aralkyl resin.

The resin composition measured by high performance liquid chromatography was 61.5% of n=0, 18.2% of n=1, 8.7% of n=2, and 11.6% of n≧3. The resin had a hydroxyl equivalent of 207.2 g/eq and a softening point of 72° C.

SYNTHESIS EXAMPLE 4

β-naphthol aralkyl resin

To the same reaction vessel as used in Synthesis Example 1, 207.3 g (1.5 moles) of α,α'-dihydroxy-p-xylene, 2160 g (15 moles) of β-naphthol and 1.18 g (0.05%) of methanesulfonic acid were charged and reacted with stirring at 150°-160 1° C. for 4 hours. Formed methanol was removed from the reaction system by the trap.

After finishing the reaction, unreacted β-naphthol and methanesulfonic acid were removed by distillation under reduced pressure to obtain 438 g of β-naphthol aralkyl resin.

The resin composition measured by high performance liquid chromatography was 83.4% of n-0, 9.2% of n=1, 4.6% of n=2, and 2.8% of n≧3. The resin had a hydroxyl equivalent of 202.6 g/eq and a softening point of 42° C.

EXAMPLES 1-16 and COMPARATIVE EXAMPLES 1-4

The compositions (parts by weight) illustrated in Table 1 and Table 2 are mixed in a Henschel mixer and melt kneaded with hot rolls at 100°-130° C. for 3 minutes.

The mixtures were cooled, crushed and tabletted to obtain molding resin compositions.

Following raw materials were used in Table 1 except the raw materials prepared in Synthesis Examples 1-4.
Phenol compound:
  Phenolic novolak PN-80 (Trade Mark of Nippon Kayaku)
Epoxy resin:
  o-Cresol novolak type epoxy resin EoCN-1020 (Trade Mark of Nippon Kayaku)
Inorganic filler:
  A mixture composed of 50 parts by weight of spherical, fused silica, HALIMIX SCo (Trade Mark of Micron) and 50 parts by weight of irregular, fused silica FUSEREX RD-8 (Trade Mark of Tatsumori)
Silane coupling agent:
  SZ-6083 (Trade Mark of Toray Dow Corning Silicone)

The molding resin compositions thus obtained were transfer molded at 180° C. under a pressure of 30 kg/cm² for 3 minutes to prepare specimens for testing physical properties. Further, semiconductor devices for the test were prepared by mounting a test element having dimensions of 10×10 mm on the element installing portion of a lead frame for a flat package type semiconductor device and then subjecting the lead frame to transfer molding at 180° C. under pressure of 30 kg/cm² for 3 minutes.

These test pieces thus molded were post cured at 180° C. for 6 hours before carrying out each test.

Results are illustrated in Table 3 and Table 4.

As illustrated by the examples and comparative examples, the resin compositions of the invention can efficiently provide heat resistance of imide resin without impairing moisture absorption.

TABLE 1

| Raw Material | Example 1 | 2 | 3 | 4 | 5 | 6 | 7 | 8 | Comparative Example 1 | 2 |
|---|---|---|---|---|---|---|---|---|---|---|
| 4,4'-Bis(3-maleimido-phenoxy)biphenyl | 15 | 15 | 15 | 15 | — | — | — | — | 15 | — |
| Bis(4-maleimidophenyl)-methane | — | — | — | — | 15 | 15 | 15 | 15 | — | 15 |
| o-Phenylphenolaralkyl resin | 10 | — | 7 | — | 5.9 | — | 3.8 | — | — | — |
| t-Phenylphenolaralkyl resin | — | 10 | — | 7 | — | 6.0 | — | 3.8 | — | — |
| Phenolic novolak | — | — | 3 | 3 | — | — | 1.2 | 1.3 | 10 | 4 |
| Epoxy resin | — | — | — | — | 4.1 | 4.0 | 5.0 | 4.9 | — | 6 |
| Inorganic filler | 75 | 75 | 75 | 75 | 75 | 75 | 75 | 75 | 75 | 75 |
| Silane coupling agent | 0.6 | 0.6 | 0.6 | 0.6 | 0.6 | 0.6 | 0.6 | 0.6 | 0.6 | 0.6 |
| Triphenyl phosphine | 0.1 | 0.1 | 0.1 | 0.1 | 0.1 | 0.1 | 0.1 | 0.1 | 0.1 | 0.1 |
| Triethylammonium tetraphenylborate | — | — | — | — | 0.3 | 0.3 | 0.3 | 0.3 | — | 0.3 |

TABLE 1-continued

| Raw Material | Example 1 | 2 | 3 | 4 | 5 | 6 | 7 | 8 | Comparative Example 1 | 2 |
|---|---|---|---|---|---|---|---|---|---|---|
| Carnuba wax | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 |
| Antimony trioxide | 1.0 | 1.0 | 1.0 | 1.0 | 1.0 | 1.0 | 1.0 | 1.0 | 1.0 | 1.0 |

TABLE 2

| Raw Material | Example 9 | 10 | 11 | 12 | 13 | 14 | 15 | 16 | Comparative Example 3 | 4 |
|---|---|---|---|---|---|---|---|---|---|---|
| 4,4'-Bis(3-maleimidophenoxy)biphenyl | 15 | 15 | 15 | 15 | — | — | — | — | 15 | — |
| Bis(4-maleimidophenyl)methane | — | — | — | — | 15 | 15 | 15 | 15 | — | 15 |
| α-Naphthol aralkyl resin | 10 | — | 7 | — | 4.4 | — | 3.5 | — | — | — |
| β-Naphthol aralkyl resin | — | 10 | — | 7 | — | 4.4 | — | 3.5 | — | — |
| Phenolic novolak | — | — | 3 | 3 | — | — | 1.5 | 1.5 | 10 | 4 |
| Epoxy resin | — | — | — | — | 5.6 | 5.6 | 5.0 | 5.0 | — | 6 |
| Inorganic filler | 75 | 75 | 75 | 75 | 75 | 75 | 75 | 75 | 75 | 75 |
| Silane coupling agent | 0.6 | 0.6 | 0.6 | 0.6 | 0.6 | 0.6 | 0.6 | 0.6 | 0.6 | 0.6 |
| Triphenyl phosphine | 0.1 | 0.1 | 0.1 | 0.1 | 0.1 | 0.1 | 0.1 | 0.1 | 0.1 | 0.1 |
| Triethylammonium tetraphenylborate | — | — | — | — | 0.3 | 0.3 | 0.3 | 0.3 | — | 0.3 |
| Carnauba wax | 0.45 | 0.45 | 0.45 | 0.45 | 0.45 | 0.45 | 0.45 | 0.45 | 0.45 | 0.45 |
| Carbon black | 0.3 | 0.3 | 0.3 | 0.3 | 0.3 | 0.3 | 0.3 | 0.3 | 0.3 | 0.3 |
| Antimony trioxide | 1.0 | 1.0 | 1.0 | 1.0 | 1.0 | 1.0 | 1.0 | 1.0 | 1.0 | 1.0 |

TABLE 3

| Property | Example 1 | 2 | 3 | 4 | 5 | 6 | 7 | 8 | Comparative Example 1 | 2 |
|---|---|---|---|---|---|---|---|---|---|---|
| Glass transition temperature (°C.) | 210 | 205 | 210 | 205 | 205 | 200 | 205 | 200 | 210 | 205 |
| Flexural strength (kg/mm$^2$) | | | | | | | | | | |
| room temperature | 16.0 | 15.0 | 16.0 | 15.5 | 15.5 | 15.0 | 15.5 | 15.0 | 16.0 | 15.5 |
| 215° C. | 6.7 | 5.7 | 6.5 | 6.0 | 6.0 | 5.5 | 6.0 | 5.5 | 6.5 | 6.0 |
| Flexural modulus (kg/mm$^2$) | 1530 | 1550 | 1500 | 1500 | 1550 | 1530 | 1500 | 1500 | 1600 | 1600 |
| Moisture absorption (%) | 0.30 | 0.30 | 0.35 | 0.35 | 0.40 | 0.40 | 0.43 | 0.43 | 0.55 | 0.60 |
| V.P.S. test (the number of cracked specimen) | 0/20 | 0/20 | 0/20 | 0/20 | 2/20 | 2/20 | 5/20 | 5/20 | 10/20 | 15/20 |

TABLE 4

| Property | Example 9 | 10 | 11 | 12 | 13 | 14 | 15 | 16 | Comparative Example 3 | 4 |
|---|---|---|---|---|---|---|---|---|---|---|
| Glass transition temperature (°C.) | 210 | 205 | 210 | 205 | 205 | 200 | 205 | 200 | 210 | 205 |
| Flexural strength (kg/mm$^2$) | | | | | | | | | | |
| room temperature | 16.0 | 15.0 | 16.0 | 15.5 | 15.5 | 15.0 | 15.5 | 15.0 | 16.0 | 15.5 |
| 215° C. | 6.5 | 5.7 | 6.5 | 6.0 | 6.0 | 5.5 | 6.0 | 5.5 | 6.5 | 6.0 |
| Flexural modulus (kg/mm$^2$) | 1530 | 1550 | 1500 | 1500 | 1550 | 1530 | 1500 | 1500 | 1600 | 1600 |
| Moisture absorption (%) | 0.30 | 0.30 | 0.35 | 0.35 | 0.40 | 0.40 | 0.43 | 0.43 | 0.55 | 0.60 |
| V.P.S. test (the number of cracked specimen) | 0/20 | 0/20 | 0/20 | 0/20 | 2/20 | 2/20 | 5/20 | 5/20 | 10/20 | 15/20 |

What is claimed is:

1. A resin composition comprising an organic component (A) which contains (a) a polymaleimide compound represented by the formula (I):

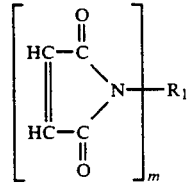

wherein $R_1$ is a m-valent organic group having two or more carbon atoms and m is an integer of two or more and (b) a phenolic aralkyl resin represented by the formula (II):

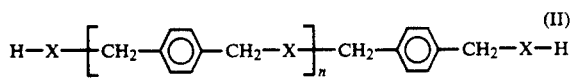

wherein X is a divalent group having the formula

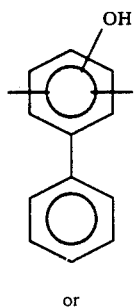

or

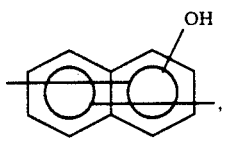

and n is an integer of from 0 to 100, or contains a mixture of the phenolic aralkyl resin and a phenol and (c) an epoxy resin, and component (B) an inorganic filler, wherein a ratio of component (b) the phenolic aralkyl resin or a mixture of the phenolic aralkyl resin to component (a) the polymaleimide compound is 10-500 parts by weight of (b) to 100 parts by weight of (a), a ratio of the phenolic resin to the phenolic aralkyl resin is 0-100 parts by weight of the phenolic resin to 100 parts by weight of the phenolic aralkyl resin, a ratio of a total amount of the (b) and (c) the epoxy resin to the component (a) is 10-500 parts by weight of the total amount of (b) and (c) to 100 parts by weight of (a), a ratio of (c) to (b) is 0.1-10 equivalent ratio of (c) per equivalent ratio of (b) and a ratio of the component (B) the inorganic filler to the organic component (A) is 100-900 parts by weight of (B) to 100 parts by weight of (A).

2. A semiconductor-sealing resin composition essentially consisting of the resin composition in claim 1.

3. The semiconductor-sealing resin composition of claim 2 wherein the phenolic resin which forms a mixture with the phenolic aralkyl resin in the ingredient (b) is a phenolic novolak resin which is a reaction product of phenol and/or substituted phenol with an aldehyde and is represented by the formula (III):

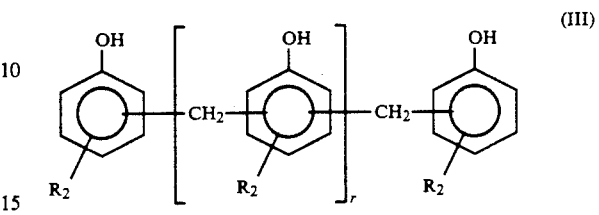

wherein $R_2$ is a hydrogen atom, hydroxyl group or alkyl group having from 1 to 9 carbon atoms, and r is an integer of 1 or more.

4. The semiconductor-sealing resin composition of claim 2 wherein the epoxy resin (c) is derived from a phenolic novolak resin which is a reaction product of a phenol and/or substituted phenol with an aldehyde an is represented by the formula (IV):

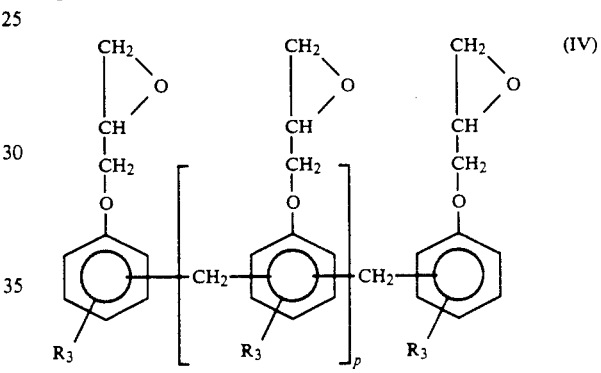

wherein $R_3$ is a hydrogen atom or alkyl group having from 1 to 9 carbon atoms and p is an integer of one or more.

5. The resin composition of claim 1 wherein the phenolic aralkyl resin is a phenylhenol aralkyl resin represented by the formula (II-A):

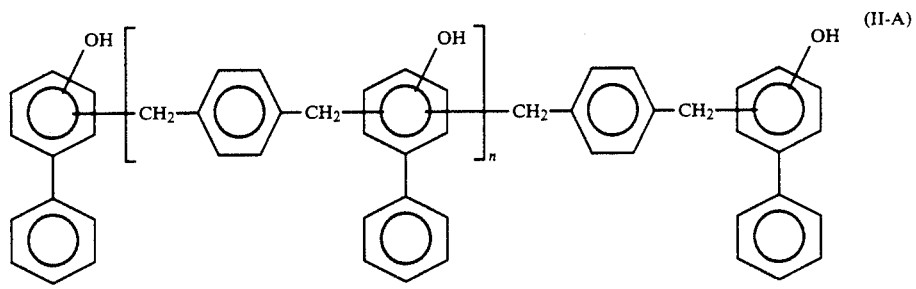

wherein n is an integer of from 0 to 100.

6. The resin composition of claim 1 wherein the phenolic aralkyl resin is a naphthol aralkyl resin represented by the formula (II-B):

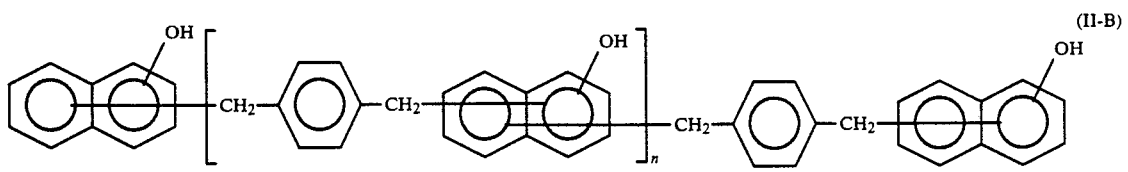
wherein n is an integer of from 0 to 100.
* * * * *